Oct. 22, 1963 J. W. THOMPSON 3,107,668
METHOD OF FORMING A TOOTH PROTECTOR
Filed July 17, 1962 2 Sheets-Sheet 1
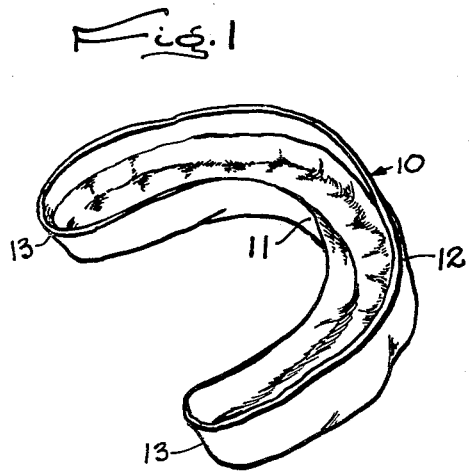
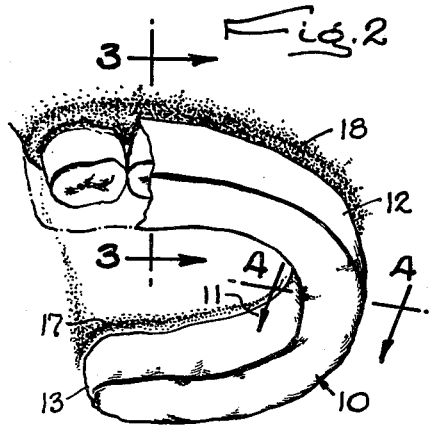
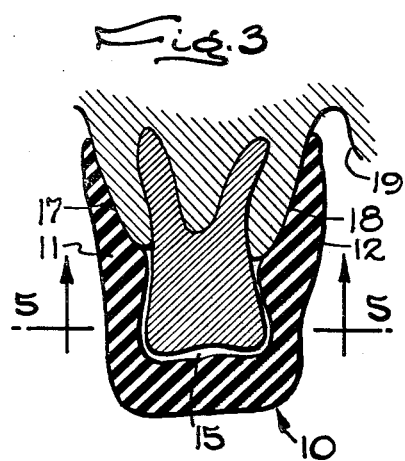
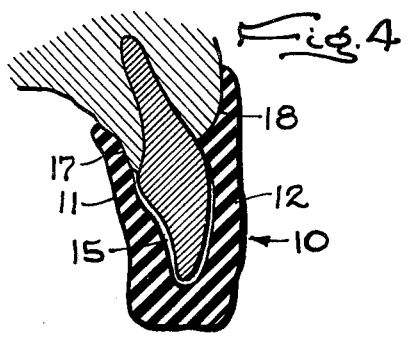
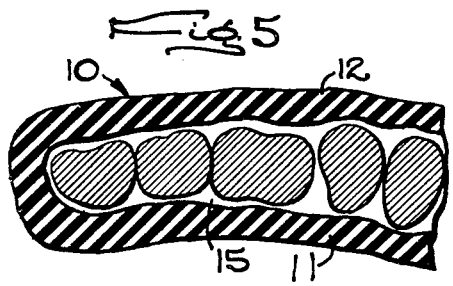
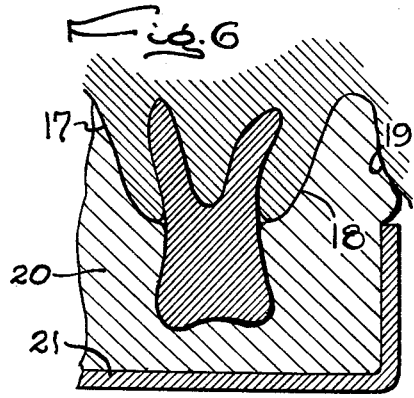
INVENTOR
Junior W. Thompson
By Wolfe, Hubbard, Voit & Osann
ATTORNEY

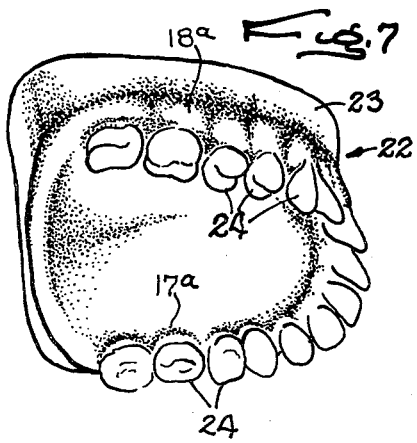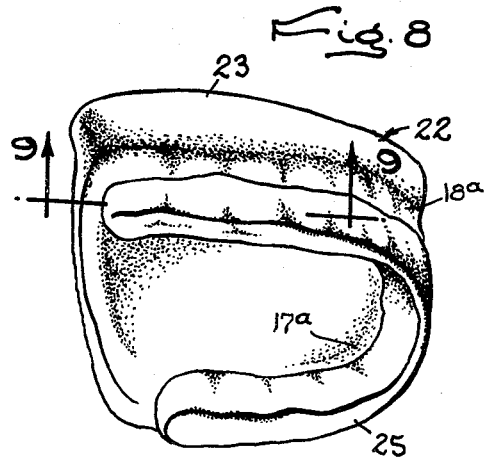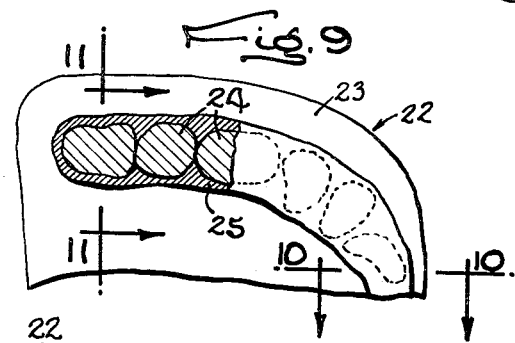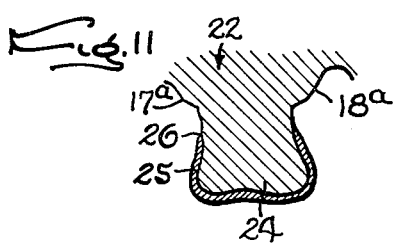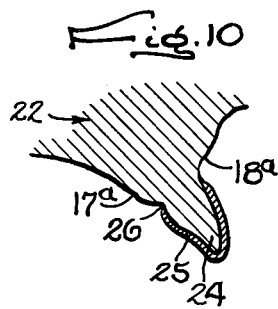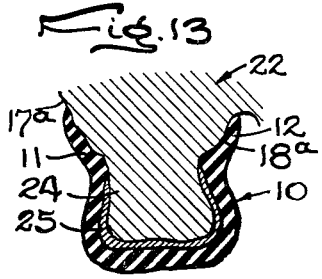

3,107,668
METHOD OF FORMING A TOOTH PROTECTOR
Junior W. Thompson, 1114½ S. Franklin St.,
Manchester, Iowa
Filed July 17, 1962, Ser. No. 210,369
3 Claims. (Cl. 128—136)

This invention relates to protectors for mouthpieces of the horseshoe channel type adapted to fit over the teeth and adjacent gum structure of athletes engaged in sports involving bodily contact between opponents. Heretofore most of such protectors, in order to afford proper protection while being comfortable to wear, have been custom-built to fit precisely over the teeth and around the gums of a particular athlete. This has necessitated taking impressions of each individual's tooth and gum structure and forming a special mouthpiece in conformance with such impression. Such custom-building is costly and inconvenient. A cheaper but less satisfactory mouthpiece may be formed directly in the mouth of the ultimate user by biting into a mass of settable plastic held in a mold fitted over the user's teeth.

The primary object of the present invention is to provide a mouthpiece which is usable universally by a large group of athletes, which satisfies all existing regulations and possesses the advantages of a custom-made protector and yet can be manufactured on a mass production basis and therefore sold over the counter at substantially lower original and replacement costs to each user.

A more detailed object is to provide a mouthpiece which is held securely and yet comfortably in the user's mouth by adhesion to the gum surfaces while fitting loosely around the tooth surfaces with enough clearance to accommodate the widely differing contours of the teeth of different users.

Another object is to provide a simple and inexpensive method of mass producing the improved guard.

Other objects and advantages of the invention will become apparent from the following detailed description taken in connection with the accompanying drawings, in which:

FIGURE 1 is a perspective view of a mouthpiece embodying the novel features of the present invention.

FIG. 2 is a perspective underside view of an individual's gum and tooth structure with the mouthpiece applied thereto.

FIGS. 3 and 4 are fragmentary sections taken along the lines 3—3 and 4—4 of FIG. 2.

FIG. 5 is a fragmentary section taken along the line 5—5 of FIG. 3.

FIG. 6 is a fragmentary section illustrating the manner of taking a full arch impression.

FIG. 7 is a perspective view of a cast made from such impression.

FIG. 8 is a perspective view of the cast modified in accordance with the present invention.

FIG. 9 is a fragmentary section taken along the line 9—9 of FIG. 8.

FIGS. 10 and 11 are fragmentary sections taken along the lines 10—10 and 11—11 of FIG. 9.

FIGS. 12 and 13 are views similar to FIGS. 10 and 11 after applying the mouthpiece material thereto.

As shown in FIGS. 1 and 2, the improved mouthpiece comprises generally a channel or shell 10 of horseshoe shape composed of relatively soft and resilient material such as cured latex rubber adapted to fit over the teeth (FIGS. 3, 4 and 5) of the individuals in a large group of athletes and, in each instance, extend well above the teeth and cover substantial areas of the adjacent inner and outer gum surfaces 17 and 18. At the ends of the channel, the side walls are integrally joined by cross-webs 13 which extend around the back molars in the user's mouth.

Adaptation of the mass produced protector to the mouths of a large group of athletes without individual or custom fitting is possible by virtue of two discoveries which I have made. First, I have found that there is a surprisingly close dimensional similarity in the size and contour of the gum structures in the mouths of a large majority of athletes. Secondly, I have found that due to the surface tension of the saliva which accumulates within the channel 10 during service use, a mouthpiece may be held securely and in proper position in the user's mouth even though the fit between the gum surfaces and the channel walls is not as precise as that achieved by custom fitting. As a result of these discoveries, it is possible, without objectionable sacrifice of proper protection and comfort to the user, to allow enough looseness or clearance around the user's teeth to accommodate the widely varying tooth contours in the mouths of different athletes of a given group.

Accordingly, the invention contemplates forming the improved protectors on a mass production basis so as to provide clearances 15 (FIGS. 3, 4 and 5) around the ends and side surfaces of the teeth of one individual representative of a group for which the protector is intended while providing a precise or custom-made fit, as shown in FIGS. 3 and 4, with the gum surfaces 17 and 18 of that individual. As a result and when the protector is positioned in the mouths of the different individuals of the group, the upper edge portions of the channel walls 11 and 12 will come into close enough tissue contact with gum surfaces of all of the individuals to coact with the accumulated saliva in achieving the desired adhesion to the gums and proper securement in the mouths of all without objectionable pressure on the gums or discomfort to any user. Some variation in the size and contours of the gums of the individual in the group is accommodated by the yieldability of the material of which the channel 10 is formed.

In practicing the improved method, the initial step illustrated in FIG. 6 involves the formation of a full arch or so-called muscle trimmed impression 20 from the gum and tooth contours of one individual considered to have a mouth structure representative of a large group of individual athletes. This is accomplished by filling a conventional tray 21 with an elastic impression material and holding this material pressed around the teeth and gums of such individual during setting of the material. Enough of the material is included in the tray to extend the impression well around the roof of the mouth and close to the junction of the outer gum surface 18 with the inner cheek surface 19. By filling the impression with the usual settable dental stone, a cast 22 shown in FIG. 7 is formed constituting an exact replica of the tooth and gum structure of the selected individual supported on a base or plate 23 to facilitate handling.

To provide the clearances 15 desired in the final use of the improved protector in the mouths of different athletes, the surfaces of the teeth 24 on the cast 22 are covered and the recesses between adjacent teeth are filled, as shown in FIGS. 8 to 11, with material 25 such as wax to a thickness corresponding to the desired width of the clearance 15. The covering is made of approximately uniform thickness over the tooth surfaces and tapers to a feather edge 26 as shown in FIGS. 10 and 11 substantially at the junction of the tooth and the gum surfaces of the cast.

The cast thus modified is used as a mold for forming any desired number of channels 10 from soft resilient rubber or other suitable material. This may be accomplished in a regular rubber molding operation or by applying liquid latex including a curing agent over the entire surface of the wax covering 25 and the adjacent gum surfaces 17ª and 18ª of the cast 22. By applying successive layers of the latex, the covering may be built up to the thickness desired in the final protector, as shown in FIGS. 12 and 13, this preferably being about 1/8 of an inch for the outer wall 12 and somewhat less, for example about 1/16 of an inch, for the inner wall 11. After curing of the rubber in the usual way in or on the modified cast, the channel is removed and trimmed to leave the walls 11 and 12 of the desired height. Since the inner surfaces of these walls constitute a precise replica of the gum surfaces of the cast 22, it will be apparent that they will fit the gum surfaces of the intended group of individuals with sufficient closeness to utilize the intervening salvia in deriving the force required for holding the protector in the mouths of each of the individuals of the group. The small variations in the gum contours of the different individuals are accommodated by yielding of the rubber walls. Also, the closeness of the fit between the channel walls and the gum surfaces 17 and 18 of the different users is not affected by the wide differences that may exist in the tooth contours of these users. That is to say, when the mouthpiece is in use, the walls 11 and 12 of the channel will contact substantial areas of the teeth of each user but different areas in the mouths of the different users in view of the different tooth formations and contours thereof. Such differences are accommodated by the clearances 15 at the bottom portion of the channel 10 and some yielding of the rubber of this part of the channel.

It has been found that one size of the channel constructed in the manner above described will serve the vast majority of athletes, the gum structure in the remaining minority may vary enough to require one or more additional sizes of the channel in order to accommodate all athletes. The close dimensional similarity prevails in the gum structure of these other groups and the protectors therefore may be made of similar internal contours following the procedure described above. Accordingly, by following the present invention, the improved mouthpiece may be adapted to the mouths of all athletes when made of about three sizes, the intermediate one of which will accommodate a large majority of the athletes.

I claim as my invention:

1. The method of making a protective tooth shield usuable by a group of individuals having dimensionally similar gum structures but different tooth contours, said method including the steps of preparing a precise replica of the tooth and gum contours in the mouth of one of said individuals, filling the spaces between and covering the teeth of said replica to enlarge the entire surface of the tooth portion of the replica, and molding a channel shaped shield of resilient material around and over gum surfaces and the enlarged tooth surfaces of said replica.

2. The method of making a protective tooth shield usable by a group of individuals having dimensionally similar gum structures but different tooth contours, said method including the steps of taking a full upper arch impression from the mouth of one of said individuals, making from said impression a cast constituting a precise replica of the tooth and gum contours of the mouth of one of said individuals, covering the tooth surfaces of said cast to enlarge the entire surface of the tooth portion of the cast while leaving the gum surfaces thereof substantially uncovered, and molding a channel shaped shield of resilient material around and over the modified cast with the inner wall of said channel following closely the gum and enlarged tooth portions of the cast.

3. The method of making a protective tooth shield usable by a group of individuals having dimensionally similar gum structures but different tooth contours, said method including the steps of, preparing a mold of the teeth and gum contours of one individual in said group, said mold comprising an exact replica of the gum contour of said one individual with the teeth contour enlarged over its entire area, and molding a channel shaped shield of resilient material around and over the gum contour and enlarged teeth contour of said mold.

References Cited in the file of this patent

UNITED STATES PATENTS

| | | |
|---|---|---|
| 2,257,709 | Anderson | Sept. 30, 1941 |
| 2,590,118 | Oddo | Mar. 25, 1952 |
| 2,800,898 | Greenblum | July 30, 1957 |